R. CLADE.
FAN.
APPLICATION FILED OCT. 16, 1920.
1,419,719.  Patented June 13, 1922.
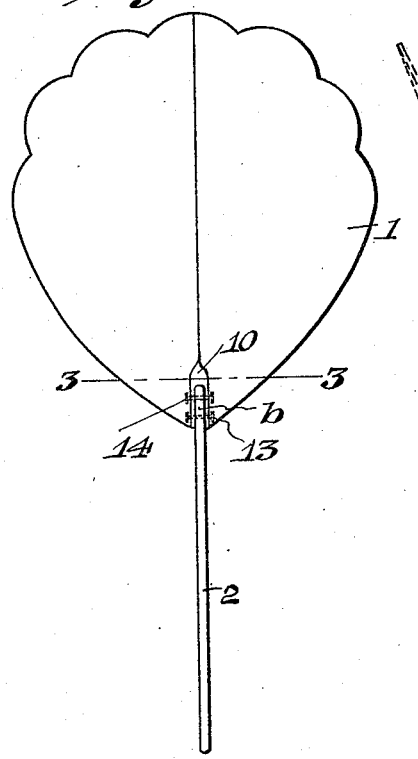
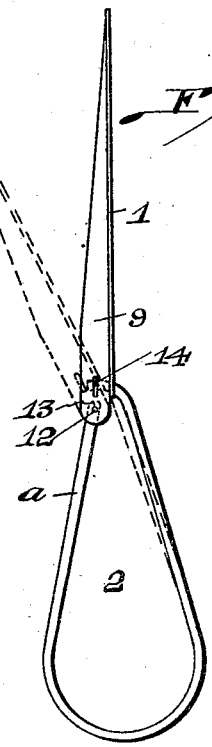

UNITED STATES PATENT OFFICE.

ROBERT CLADE, OF NEWARK, NEW JERSEY.

FAN.

1,419,719.	Specification of Letters Patent.	Patented June 13, 1922.

Application filed October 16, 1920. Serial No. 417,397.

*To all whom it may concern:*

Be it known that I, ROBERT CLADE, a citizen of the United States, and a resident of Newark, county of Essex, and State of New Jersey, have invented a certain new and useful Fan, of which the following is a specification.

My invention relates to fans of what may be termed the semi-automatic type, in which the fan proper is moved in one direction by a manual operation, and in the opposite direction by mechanical means, and has for its objects to produce an article of the character described which will be simple and cheap to manufacture, which will be of small size and of attractive appearance, which will not easily get out of order, and which may be operated with a minimum of energy by the operator.

These and further objects will more fully appear in the following specification and accompanying drawings considered together or separately.

I have illustrated one embodiment of the invention in the accompanying drawings, in which like parts in all of the figures are designated by similar characters, and in which—

Fig. 1 is a face view of a fan constructed in accordance with my invention.

Fig. 2 is an edge view of the same.

Fig. 3 is a section taken on the line 3—3 of Fig. 1, and

Fig. 4 is a detail view of a modification.

In carrying out my invention I provide a fan comprising a vane 1 and a handle 2. The vane is preferably composed of a thin sheet of more or less tough material such as celluloid, paper, etc. The handle is composed of elastic material in wire form and bent to more or less loop shape whereby its ends are brought into proximity.

In the drawings the vane 1 is provided with a rib 9 on a plane side of the vane as shown. Said rib is preferably an integral part of the vane the material of which is creased along its central line to form such rib or corrugation. At the lower edge of the vane the walls of the crease are spread apart to form an open groove 10 the walls of which are pierced on opposite sides by oppositely disposed slots 11 and perforations 12.

The ends of the handle member are inserted in the groove 10. The end $a$ being pivoted in the alined perforations 12, 12 by means of a pivot 13, while the end $b$ of the handle is pivoted in the alined slots 11, 11 on a pivot 14. The pivots 13 and 14 are preferably hollow rivets of ordinary construction. The end of the handle member $b$ is bent over in the direction of the plane of the loop whereby the two ends of the member will not come in contact when the device is operated.

All of the parts except the pivots are preferably composed of celluloid, such material being cheap, tough, of sufficient elasticity for use as the spring handle as well as the vane, and capable of ornamentation.

The operation is as follows:

The handle is held in the palm of the hand with the fingers resting on the outside of one handle member above the loop, and the thumb engaging the outside of the other member, and the vane standing upright above the thumb and forefinger, and in the position shown in full lines in Fig. 2. Pressure is now applied to the handle members tending to move the ends toward each other. The vane will pivot on the end $a$ of the handle member, the end $b$ riding downward in the slot 6 while the vane is being moved to the position shown in broken lines in Fig. 2. The pressure on the handle members is now released and the resiliency of the handle will return the vane to the original position.

If desired instead of the slots 11 being in the walls of the recess 10, a single slot 11$^a$ may be formed in the limb $b$. In this case the pivots 13 and 14 may be glued or otherwise secured in the walls of the recess, and the working surface will be in the comparatively heavy spring member.

In accordance with the provisions of the patent statutes I have described the principle of my invention, together with the apparatus which I now consider to represent the best embodiment thereof, but I desire to have it understood that the apparatus shown is merely illustrative, and that the invention may be carried out in other ways.

Having now described my invention what I claim and desire to secure by Letters Patent, is:

A device of the character described, comprising a vane, a rib on the vane, said rib extending to an edge of the vane, there being a groove in the rib, there being alined perforations in the rib on opposite sides of the groove, said rib having alined slots on opposite sides of the groove, the length of the slots being radially disposed relatively to the perforations, a resilient member of attenuated form bent whereby its ends are in proximity, one of said ends being pivoted in the groove on an element carried in the perforations, the other of said ends being pivoted in the groove on an element carried in the slots, whereby as the limbs of the member are moved toward or away from each other the vane will be caused to oscillate about one of the pivots.

This specification signed and witnessed this 20th day of July, 1920.

ROBERT CLADE.

Witnesses:
J. F. COLEMAN,
A. E. RENTON.